US012618340B2

(12) United States Patent
Tomes

(10) Patent No.: US 12,618,340 B2
(45) Date of Patent: May 5, 2026

(54) CONTROLLED CONTACT INDUCED BUCKLING OF SPOKED BEARING SUPPORT

(71) Applicant: Pratt & Whitney Canada Corp., Longueuil (CA)

(72) Inventor: Nathan Tomes, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 175 days.

(21) Appl. No.: 18/749,174

(22) Filed: Jun. 20, 2024

(65) Prior Publication Data

US 2025/0389205 A1 Dec. 25, 2025

(51) Int. Cl.
*F16C 27/04* (2006.01)
*F01D 25/16* (2006.01)

(52) U.S. Cl.
CPC ............ *F01D 25/164* (2013.01); *F16C 27/04* (2013.01); *F16C 2360/23* (2013.01)

(58) Field of Classification Search
CPC ..... F16C 27/04; F16C 2360/23; F01D 25/164
See application file for complete search history.

(56) References Cited

U.S. PATENT DOCUMENTS

| | | | |
|---|---|---|---|
| 6,079,200 A | 6/2000 | Tubbs | |
| 8,430,622 B2 | 4/2013 | Webster et al. | |
| 9,777,596 B2 | 10/2017 | Raykowski et al. | |

| | | | |
|---|---|---|---|
| 10,274,017 B2 | 4/2019 | Ganiger et al. | |
| 11,692,482 B2 * | 7/2023 | Hicks ........................ | F02C 7/36 |
| | | | 415/229 |
| 11,702,993 B2 | 7/2023 | Buchholz | |
| 2020/0157971 A1 | 5/2020 | Buchholz et al. | |

FOREIGN PATENT DOCUMENTS

| | | | | |
|---|---|---|---|---|
| CA | 2471665 A1 | 12/2004 | | |
| DE | 102020211755 A1 * | 3/2022 | ............ | F16C 35/077 |
| EP | 1659266 A1 | 5/2006 | | |

OTHER PUBLICATIONS

Extended European Search Report for EP Application No. 25184002. 1, dated Oct. 30, 2025, pp. 1-6.

* cited by examiner

*Primary Examiner* — Phillip A Johnson
(74) *Attorney, Agent, or Firm* — CANTOR COLBURN LLP

(57) ABSTRACT

A bearing arrangement of a gas turbine engine includes a first bearing supportive of a shaft, and a second bearing axially offset from the first bearing. A first bearing support extends from a bearing housing to the first bearing, and a second bearing support extends from a bearing housing to the second bearing. One or more radial bearing supports including a plurality of radial spokes extend between the bearing housing and the second bearing. The spokes are configured to buckle under compression when radial loads at the second bearing exceed a predetermined force threshold. An axially-extending spoke foot extends from at least one radial spoke. The axially-extending foot is configured to contact the second bearing in the event of a tilt of the second bearing beyond a predetermined angle threshold, reducing the buckling force of the plurality of radial spokes below a second predetermined force threshold.

20 Claims, 5 Drawing Sheets

CONTROLLED CONTACT INDUCED BUCKLING OF SPOKED BEARING SUPPORT

BACKGROUND

Exemplary embodiments pertain to the art of turbomachinery such as gas turbine engines. In particular, the present disclosure relates to bearing assemblies and support of bearing assemblies of gas turbine engines.

During a fan blade off event (FBO), some designs require that two bearings on the engine be broken to help limit the load and vibrations transferred from the rotor to the engine and aircraft structure caused by the unbalance resulting from the FBO.

A typical bearing support 200 configuration is illustrated in FIG. 8. A first bearing 202 is a roller bearing supporting radial loads, and requires low support stiffness and is broken by buckling of a first bearing support 204. A second bearing 206 is a ball bearing, supportive of axial and radial loads. The second bearing 206 requires high support stiffness and is broken by fracturing bolts 210 between the second bearing 206 and a second bearing support 208. Configuring the bolts 210 to always break at FBO, requiring high stress, but to not yield at limit loads or during installation and have a full low-cycle fatigue life, all requiring low stress, is very difficult.

BRIEF DESCRIPTION

In one exemplary embodiment, a bearing arrangement of a gas turbine engine includes a first bearing supportive of a shaft, and a second bearing axially offset from the first bearing and supportive of the shaft. A first bearing support extends from a bearing housing to the first bearing to support the first bearing, and a second bearing support extends from a bearing housing to the second bearing to support the second bearing. One or more radial bearing supports including a plurality of radial spokes extend between the bearing housing and the second bearing. The plurality of radial spokes are configured to buckle under compression when radial loads at the second bearing exceed a predetermined force threshold. An axially-extending spoke foot extends from at least one radial spoke of the plurality of radial spokes. The axially-extending foot is configured to contact the second bearing in the event of a tilt of the second bearing beyond a predetermined angle threshold, reducing the buckling force of the plurality of radial spokes below a second predetermined force threshold.

Additionally or alternatively, in this or other embodiments the radial bearing support includes an outer ring positioned at the bearing housing, and the plurality of radial spokes extend from the outer ring to a spoke tip at the second bearing.

Additionally or alternatively, in this or other embodiments the spoke foot is positioned nearer to the spoke tip than to the outer ring.

Additionally or alternatively, in this or other embodiments a spoke tip of each of the radial spokes are configured to contact the second bearing while not being secured thereto.

Additionally or alternatively, in this or other embodiments one or more bumpers axially offset from the radial bearing support are configured to limit radial travel of the second bearing following buckling of the radial spokes.

Additionally or alternatively, in this or other embodiments the spoke foot extends from the spoke in a first axial direction toward the first bearing.

Additionally or alternatively, in this or other embodiments the spoke foot extends from the spoke in a second axial direction away from the first bearing.

Additionally or alternatively, in this or other embodiments the spoke foot is configured to contact the bearing outer race of the second bearing when the second bearing tilts.

Additionally or alternatively, in this or other embodiments each spoke of the plurality of radial spokes includes a spoke foot.

Additionally or alternatively, in this or other embodiments the second threshold radial load is a fan blade off load of the gas turbine engine, and the threshold angle is exceeded only following fan blade off of the gas turbine engine.

In another exemplary embodiment, a gas turbine engine includes a combustor, a turbine driven by combustion products of the combustor, a shaft driven by rotation of the turbine, and a bearing arrangement supportive of the shaft. The bearing arrangement includes a first bearing and a second bearing axially offset from the first bearing. A first bearing support extends from a bearing housing to the first bearing to support the first bearing, and a second bearing support extends from a bearing housing to the second bearing to support the second bearing. One or more radial bearing supports including a plurality of radial spokes extend between the bearing housing and the second bearing. The plurality of radial spokes are configured to buckle under compression when radial loads at the second bearing exceed a predetermined threshold. An axially-extending spoke foot extends from at least one radial spoke of the plurality of radial spokes. The axially-extending foot is configured to contact the second bearing in the event of a tilt of the second bearing beyond a predetermined angle threshold, reducing the buckling force of the plurality of radial spokes below a second predetermined force threshold.

Additionally or alternatively, in this or other embodiments the radial bearing support includes an outer ring positioned at the bearing housing, and the plurality of radial spokes extend from the outer ring to a spoke tip at the second bearing.

Additionally or alternatively, in this or other embodiments the spoke foot is positioned nearer to the spoke tip than to the outer ring.

Additionally or alternatively, in this or other embodiments a spoke tip of each of the radial spokes are configured to contact the second bearing while not being secured thereto.

Additionally or alternatively, in this or other embodiments one or more bumpers axially offset from the radial bearing support are configured to limit radial travel of the second bearing.

Additionally or alternatively, in this or other embodiments the spoke foot extends from the spoke in a first axial direction toward the first bearing.

Additionally or alternatively, in this or other embodiments the spoke foot extends from the spoke in a second axial direction away from the first bearing.

Additionally or alternatively, in this or other embodiments the spoke foot is configured to contact the bearing outer race of the second bearing when the second bearing tilts.

Additionally or alternatively, in this or other embodiments each spoke of the plurality of radial spokes includes a spoke foot.

Additionally or alternatively, in this or other embodiments the second threshold radial load is a fan blade off load of the gas turbine engine, and the threshold angle is exceeded only following fan blade off of the gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
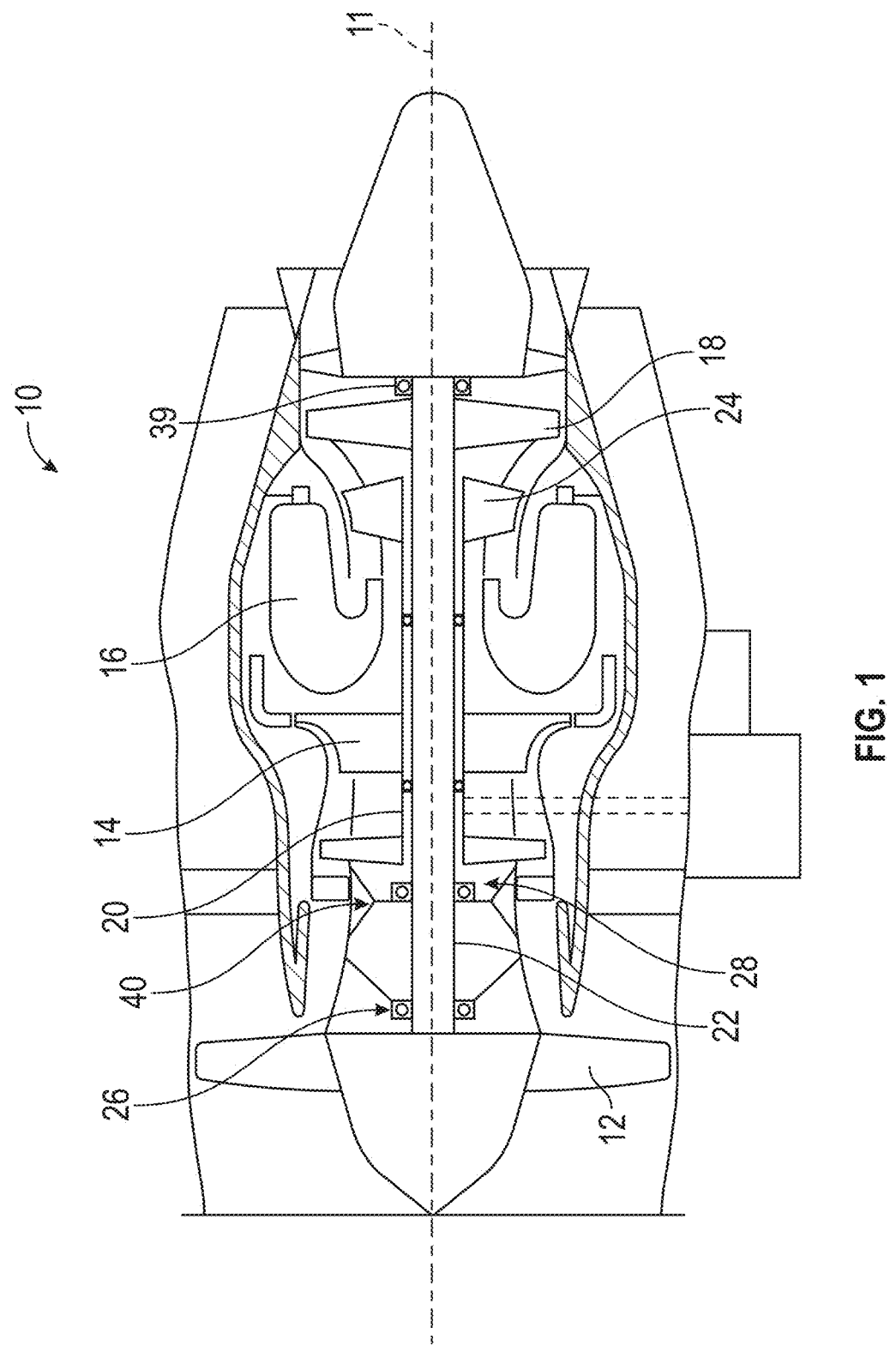
FIG. 1 is a partial cross-sectional view of a gas turbine engine.

FIG. 1 illustrates a turbofan gas turbine engine 10 of a type preferably provided for use in subsonic flight and generally comprising a low pressure spool assembly, which includes a fan assembly 12, a low pressure compressor assembly (not shown) and a low pressure turbine assembly 18 connected by a low pressure shaft 22, and a high pressure spool assembly, which includes a high pressure compressor assembly 14 and a high pressure turbine assembly 24 connected by a high pressure shaft 20. The engine 10 further comprises a combustor 16 in which compressed air from the high pressure compressor 14 is mixed with fuel and ignited for generating an annular stream of hot combustion gases from which the low pressure and high pressure turbine sections extract energy, as known in the art.

The low pressure spool is rotatably supported by a number of axially spaced-apart bearings concentrically mounted about the central axis 11 of the engine 10. The low pressure shaft 22 is supported at its front or upstream end by first and second bearings 26 and 28 respectively commonly referred to as the #1 and #2 bearings and at a rear end thereof by a third hearing 39 which may be the #5 bearing of the engine (the #3 and #4 bearings rotatably supporting the high pressure shaft 20). The bearing arrangement for a particular engine, including but not limited to the number and type of bearings selected, is typically determined by a number of factors specific to that engine.

The bearing arrangement described herein is exemplary only, and is not intended to be limiting. In this example, the forward and rearward most bearings, i.e. the #1 and #5 bearings, may be roller bearings for radially supporting the low pressure shaft 22. As shown in FIG. 1, the first bearing 26 is disposed adjacent the fan rotor, while the #2 bearing 28 is disposed adjacent to and downstream from the first bearing 26, and upstream of the high pressure compressor 14 relative to a flow direction of the gases through the engine

10. The bearings and supporting structure flanges may be arranged in any suitable fashion in the context of the present application.

Figure 2:
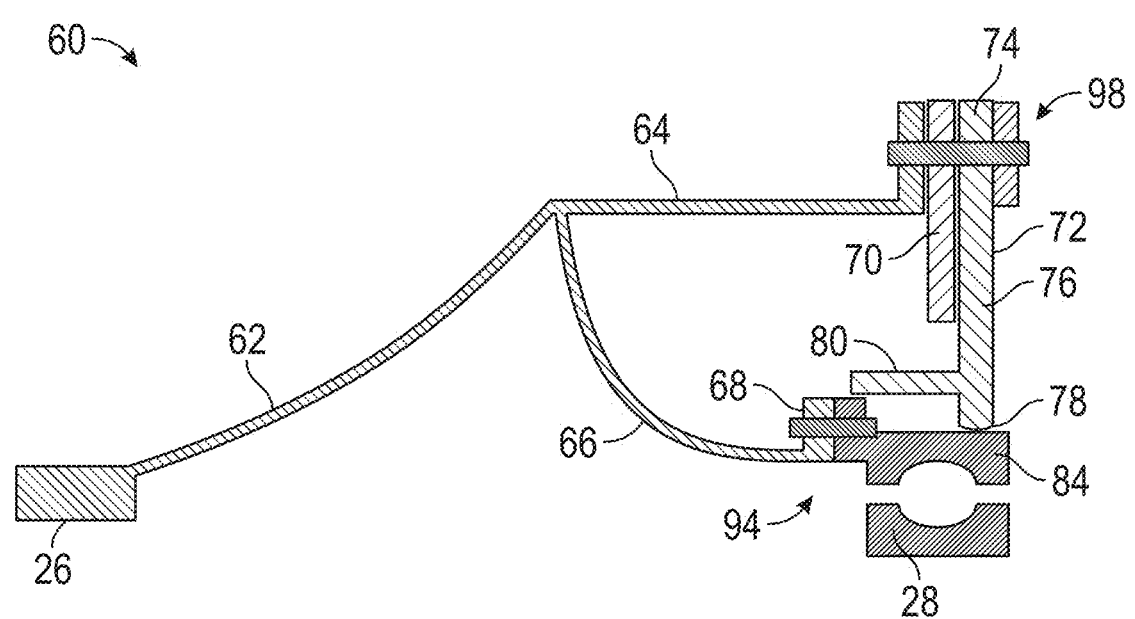
FIG. 2 is a schematic cross-sectional view of an embodiment of a bearing support arrangement of a gas turbine engine.

Referring now to FIG. 2, illustrated is an embodiment of a bearing support arrangement 60. A first bearing 26, a roller bearing, which is also illustrated in FIG. 1, is supported and positioned by a first bearing support 62, which extends from a bearing housing 64. A second bearing 28, a ball bearing, which is also illustrated in FIG. 1, is supported by a second bearing support 66, which also extends from the bearing housing 64. The second bearing support 66 must provide sufficiently stiff axial support for the second bearing 28 for rotor stability, but it must not carry significant radial loading. This can be achieved with features like a squirrel cage or hairpin. In some embodiments, the second bearing support 66 can have a shared load path with the first bearing support 62, but this is not required.

Figure 7:
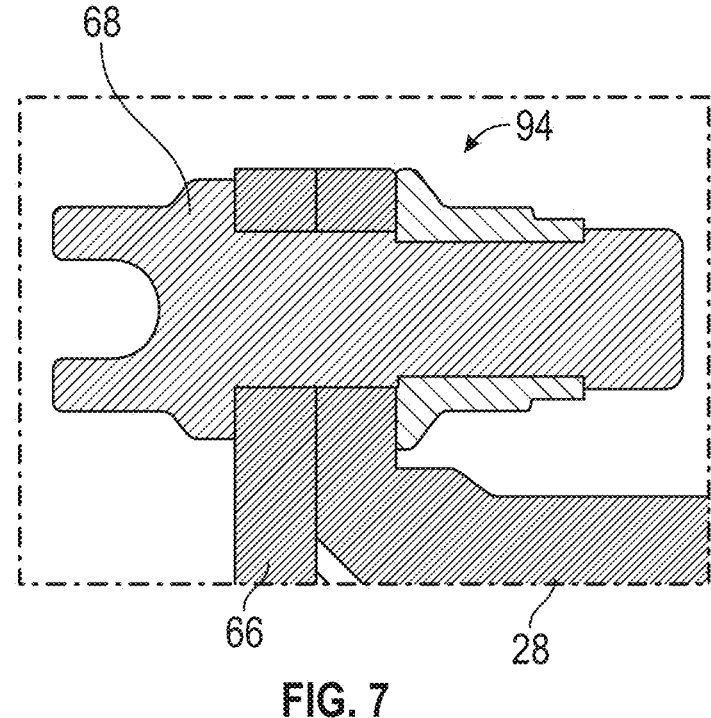
FIG. 7 is a schematic illustration of an embodiment of an inner flange arrangement.
Figure 8:
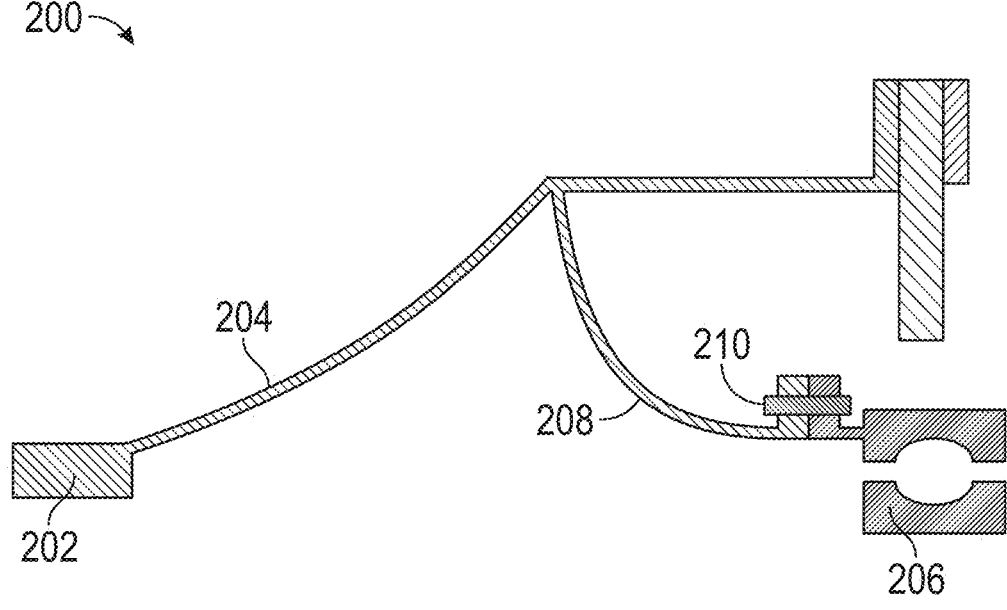
FIG. 8 is a schematic illustration of a previous bearing support arrangement of a gas turbine engine.

Bolts 68 are disposed between the second bearing 28 and the second bearing support 66, and are in some embodiments configured to fracture in a fan blade off (FBO) condition. As illustrated in FIG. 7, the bolts 68 extend through an inner flange arrangement 94 to connect the second bearing support 66 to the second bearing 28. While fracture or failure of the bolts is not required, in some embodiments fracture may improve dynamic behavior. A bumper 70 extends from the bearing housing 64 radially inwardly toward the second bearing 28 to limit radial displacement of the second bearing 28. Additionally, a radial support 72 surrounds the second bearing 28.

Figure 3:
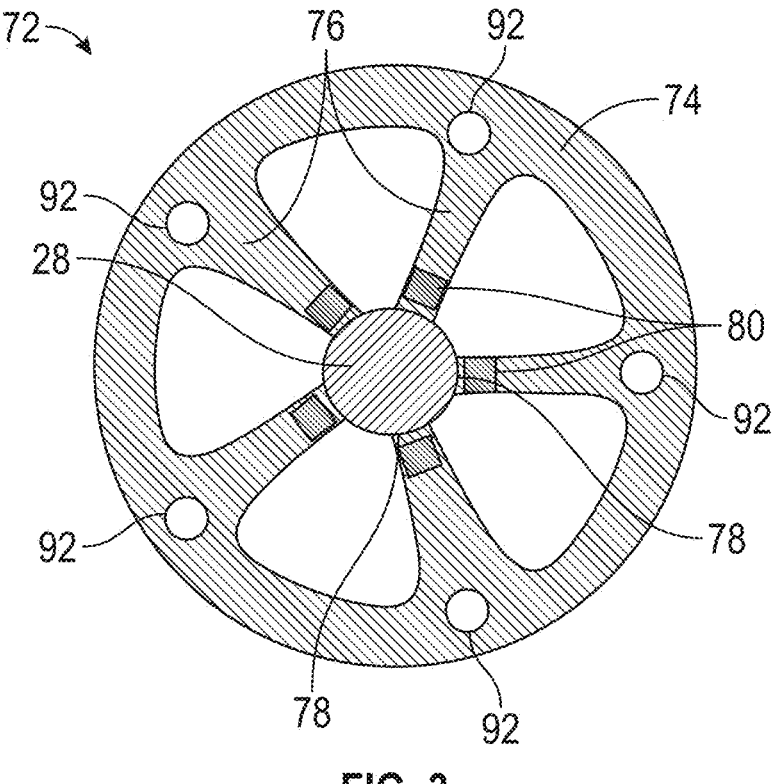
FIG. 3 is a cross-sectional view of an embodiment of a radial support of a bearing arrangement.
Figure 6:
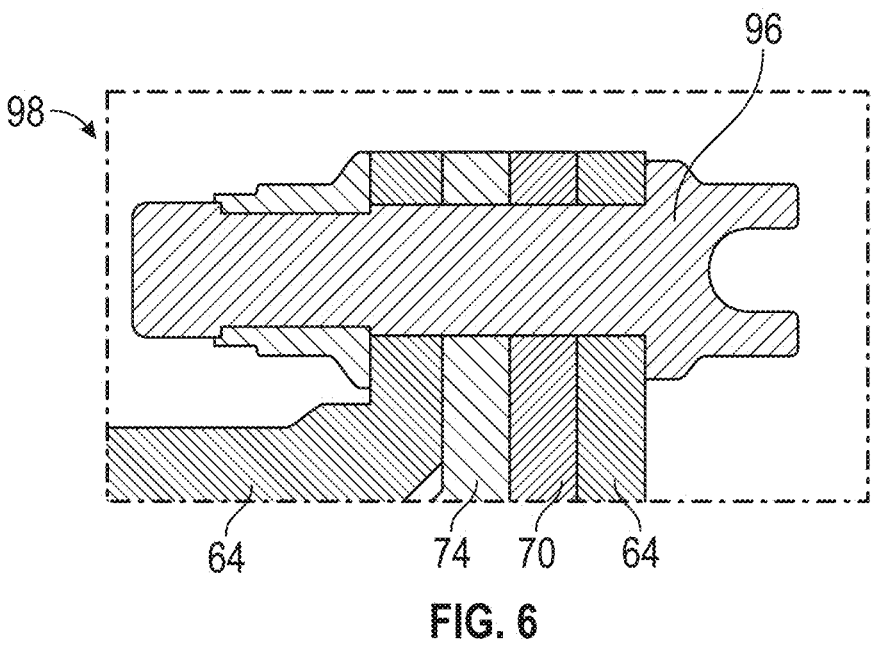
FIG. 6 is a schematic illustration of an embodiment of an outer flange arrangement.

Referring now to FIG. 3, an embodiment of the radial support 72 is illustrated. The radial support 72 includes an outer ring 74 disposed at and secured to the bearing housing 64, and a plurality of radial spokes 76 extending from the outer ring 74 toward the second bearing 28. The radial spokes 76 each include a spoke tip 78 that contacts the second bearing 28, but is not secured to the second bearing 28. In some embodiments, as illustrated in FIG. 6, the outer ring 74 is secured to the bearing housing 64 using fasteners and the bumper 70 at outer flange arrangement 98 using fasteners 96 extending through fastener openings shown schematically in FIG. 3 as 92. Referring again to FIG. 2, the spoke tip 78 includes an uneven profile, one that is, for example, curvilinear, to both ensure compression on the spoke 76 and to ensure that the radial contact force of the second bearing 28 is axially centered on the spoke 76. The spokes 76 are configured to buckle to limit the loads in the engine 20 during an FBO event while also providing a high radial stiffness during normal operation. Buckling of the spokes 76 occurs when there are compressive loads on the spokes 76 above a predetermined level. The failure force required for such buckling to occur is significantly less than the failure force required without buckling, which causes the bearing support to be less stressed during normal operation compared to other configurations.

The buckling capacity of the radial support 72 is configured to be greater than ultimate maneuver loads of the aircraft and loads experienced during FBO.

Figure 4:
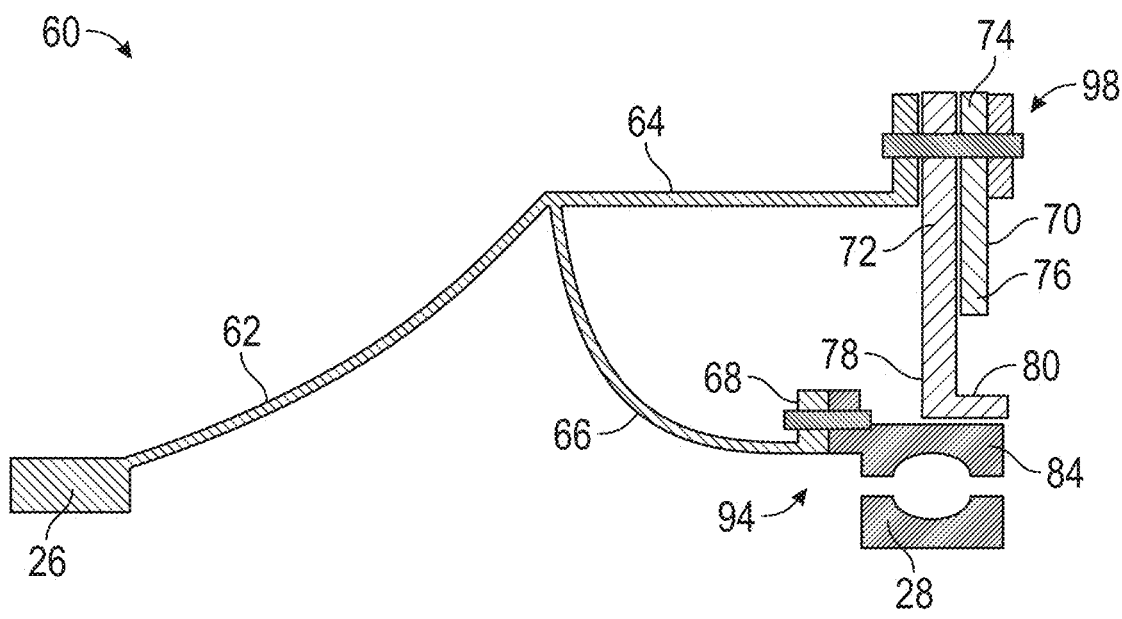
FIG. 4 is a schematic cross-sectional view of another embodiment of a bearing support arrangement of a gas turbine engine.

Referring again to FIG. 2, the spokes 76 each include a spoke foot 80 extending axially from the spoke 76 toward the first bearing 26, that in some embodiments, at least partially overlaps the bolted flange 68. In some embodiments, the spoke foot 80 is rectangular in shape and is located at or near the spoke tip 78, or closer to the spoke tip 78 than to the outer ring 74. While in the embodiment of FIG. 2, the spoke foot 80 extends toward the first bearing 26, in other embodiments such as shown in FIG. 4, the spoke foot 80 extends in an opposite direction, away from the first bearing 26.

Figure 5:
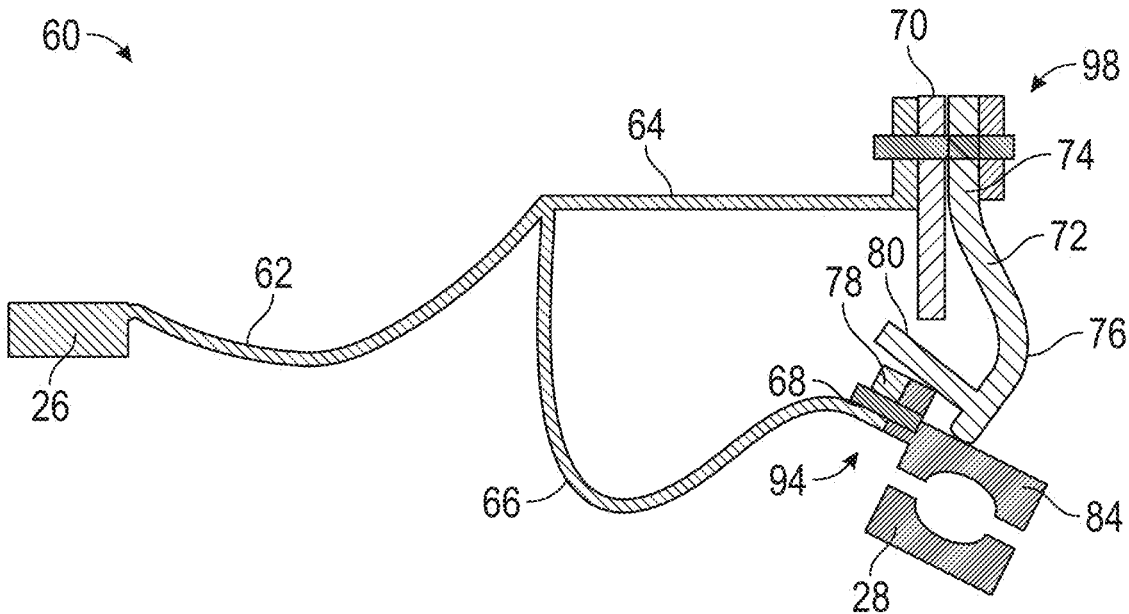
FIG. 5 is a schematic cross-sectional view of the embodiment of FIG. 2 in a fan blade off (FBO) event.

During a FBO event, as illustrated in FIG. 5, the shaft tilts due to unbalance at the fan, causing the second bearing 38b to cross corner and tilt. The spoke foot 80 contacts the second bearing 28 at, for example, a bearing outer race 84 or at the bolted flange 68. This destabilizes the spokes 76, thus reducing its buckling capacity to below FBO or run-down levels. Under rundown conditions after an FBO, a fan resonance occurs that increases the radial forces and moments beyond the reduced buckling margin, thus causing buckling or collapse of the spokes 76. The clearance between the spoke foot 80 and the second bearing 28 is selected to that contact only occurs during an FBO event.

The embodiments disclosed herein provide that the two bearings 26 and 28 fail during an FBO event to limit the load and vibrations transferred from the rotor to the engine and aircraft structure caused by the resulting imbalance. The failure of the second bearing 28 is achieved via buckling of the main radial bearing support 72, thus improving normal operating low-cycle fatigue (LCF) performance compared to frangible designs requiring fracture under FBO conditions.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this speci-fication, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodi-ment disclosed as the best mode contemplated for carrying out this present disclosure, but that the present disclosure will include all embodiments falling within the scope of the claims.

What is claimed is:

1. A bearing arrangement of a gas turbine engine, com-prising:
   a first bearing supportive of a shaft;
   a second bearing axially offset from the first bearing and supportive of the shaft;
   a first bearing support extending from a bearing housing to the first bearing to support the first bearing;
   a second bearing support extending from a bearing hous-ing to the second bearing to support the second bearing;
   one or more radial bearing supports including a plurality of radial spokes extending between the bearing housing and the second bearing, the plurality of radial spokes configured to buckle under compression when radial loads at the second bearing exceed a predetermined force threshold; and
   an axially-extending spoke foot extending from at least one radial spoke of the plurality of radial spokes, the axially-extending foot configured to contact the second bearing in the event of a tilt of the second bearing beyond a predetermined angle threshold, reducing the buckling force of the plurality of radial spokes below a second predetermined force threshold.

2. The bearing arrangement of claim 1, wherein the radial bearing support includes an outer ring disposed at the bearing housing, and the plurality of radial spokes extend from the outer ring to a spoke tip at the second bearing.

3. The bearing arrangement of claim 2, wherein the spoke foot is disposed nearer to the spoke tip than to the outer ring.

4. The bearing arrangement of claim 1, wherein a spoke tip of each of the radial spokes are configured to contact the second bearing while not being secured thereto.

5. The bearing arrangement of claim 1, further comprising one or more bumpers axially offset from the radial bearing support configured to limit radial travel of the second bearing following buckling of the radial spokes.

6. The bearing arrangement of claim 1, wherein the spoke foot extends from the spoke in a first axial direction toward the first bearing.

7. The bearing arrangement of claim 1, wherein the spoke foot extends from the spoke in a second axial direction away from the first bearing.

8. The bearing arrangement of claim 1, wherein the spoke foot is configured to contact the bearing outer race of the second bearing when the second bearing tilts.

9. The bearing arrangement of claim 1, wherein each spoke of the plurality of radial spokes includes a spoke foot.

10. The bearing arrangement of claim 1, wherein the second threshold radial load is a fan blade off load of the gas turbine engine, and the threshold angle is exceeded only following fan blade off of the gas turbine engine.

11. A gas turbine engine, comprising:
   a combustor;
   a turbine driven by combustion products of the combus-tor;
   a shaft driven by rotation of the turbine; and
   a bearing arrangement supportive of the shaft, the bearing arrangement including:
      a first bearing;
      a second bearing axially offset from the first bearing;
      a first bearing support extending from a bearing hous-ing to the first bearing to support the first bearing;
      a second bearing support extending from a bearing housing to the second bearing to support the second bearing;
      one or more radial bearing supports including a plu-rality of radial spokes extending between the bearing housing and the second bearing, the plurality of radial spokes configured to buckle under compres-sion when radial loads at the second bearing exceed a predetermined threshold; and
      an axially-extending spoke foot extending from at least one radial spoke of the plurality of radial spokes, the axially-extending foot configured to contact the sec-ond bearing in the event of a tilt of the second bearing beyond a predetermined angle threshold, reducing the buckling force of the plurality of radial spokes below a second predetermined force thresh-old.

12. The gas turbine engine of claim 11, wherein the radial bearing support includes an outer ring disposed at the bearing housing, and the plurality of radial spokes extend from the outer ring to a spoke tip at the second bearing.

13. The gas turbine engine of claim 12, wherein the spoke foot is disposed nearer to the spoke tip than to the outer ring.

14. The gas turbine engine of claim 11, wherein a spoke tip of each of the radial spokes are configured to contact the second bearing while not being secured thereto.

15. The gas turbine engine of claim 11, further comprising one or more bumpers axially offset from the radial bearing support configured to limit radial travel of the second bearing.

16. The gas turbine engine of claim 11, wherein the spoke foot extends from the spoke in a first axial direction toward the first bearing.

17. The gas turbine engine of claim 11, wherein the spoke foot extends from the spoke in a second axial direction away from the first bearing.

18. The gas turbine engine of claim 11, wherein the spoke foot is configured to contact the bearing outer race of the second bearing when the second bearing tilts.

19. The gas turbine engine of claim 11, wherein each spoke of the plurality of radial spokes includes a spoke foot.

20. The gas turbine engine of claim 11, wherein the second threshold radial load is a fan blade off load of the gas turbine engine, and the threshold angle is exceeded only following fan blade off of the gas turbine engine.

* * * * *